United States Patent
Godfrey et al.

(10) Patent No.: US 10,588,289 B2
(45) Date of Patent: Mar. 17, 2020

(54) TEAT PREPARATION SPRAY RING

(71) Applicant: Technologies Holdings Corp., Houston, TX (US)

(72) Inventors: Robert J. Godfrey, Monona, WI (US); Eugene P. Frakes, Mt. Horeb, WI (US)

(73) Assignee: TECHNOLOGIES HOLDINGS CORP., Houston, TX (US)

( * ) Notice: Subject to any disclaimer, the term of this patent is extended or adjusted under 35 U.S.C. 154(b) by 1078 days.

(21) Appl. No.: 15/016,661

(22) Filed: Feb. 5, 2016

(65) Prior Publication Data
US 2017/0223920 A1    Aug. 10, 2017

(51) Int. Cl.
*A01K 7/04* (2006.01)
*A01J 7/04* (2006.01)
*A01K 13/00* (2006.01)

(52) U.S. Cl.
CPC ............... *A01J 7/04* (2013.01); *A01K 13/001* (2013.01)

(58) Field of Classification Search
CPC .......... A01K 13/00; A01K 13/001; A01J 7/04
See application file for complete search history.

(56) References Cited

U.S. PATENT DOCUMENTS

| | | | |
|---|---|---|---|
| 4,903,639 A | 2/1990 | Kessel | |
| 4,924,809 A * | 5/1990 | Verbrugge | A01J 5/044 119/14.02 |
| 5,314,123 A * | 5/1994 | Miller | A01K 13/001 239/120 |
| 7,165,510 B2 * | 1/2007 | Hakes | A61D 1/02 119/652 |
| 8,534,231 B2 * | 9/2013 | Hakes | A01J 7/04 119/652 |

(Continued)

FOREIGN PATENT DOCUMENTS

EP    0 029 240    5/1981
WO    WO 2006/135917    12/2006

OTHER PUBLICATIONS

U.S. Food and Drug Administration; Teat Preparation Protocol GEA Farms Technologies, Incorporated Mlone USA Robotic Milking System; 13 pages; http://www.fda.gov/Food/GuidanceRegulation/GuidanceDocumentsRegulatoryInformation/Milk/ucm274978.htm, Sep. 21, 2011.

(Continued)

*Primary Examiner* — Monica L Williams
*Assistant Examiner* — Aaron M Rodziwicz
(74) *Attorney, Agent, or Firm* — Baker Botts, LLP (57) ABSTRACT

A teat preparation liner comprising an inlet for fluid flow into the liner, an opening, a liner cavity and a spray ring. The liner cavity is positioned adjacent to the opening inside the liner and surrounds a portion of the liner. The spray ring has a hollow interior and a plurality of apertures. The spray ring is coupled to the inlet so that fluid flows from the inlet into the hollow interior of the spray ring and out of the spray ring through the plurality of apertures. The spray ring is positioned inside the liner cavity so that the plurality of apertures face the inside of the liner opening. The spray ring is operable to encircle a dairy animal teat that is positioned inside the liner via the liner opening to simultaneously direct fluid flow from the inlet onto multiple portions of the teat via the apertures.

12 Claims, 4 Drawing Sheets

(56) References Cited

U.S. PATENT DOCUMENTS 9,820,468 B2 * 11/2017 Van Den Berg ........ A01J 5/017
2007/0199519 A1 * 8/2007 Jacques .................... A01J 7/04
119/670

OTHER PUBLICATIONS

Notification of Transmittal of the International Search Report and the Written Opinion of the International Search Authority, or the Declaration, International Application No. PCT/US2017/016326, dated May 2, 2017.

* cited by examiner

TEAT PREPARATION SPRAY RING

TECHNICAL FIELD OF THE INVENTION

The present invention relates generally to dairy equipment, and more specifically to a teat preparation spray ring.

BACKGROUND

Dairy farms and parlors often need to prepare and clean the teats of a dairy animal before the animal can be milked. Current approaches for preparing and cleaning dairy animal teats are ineffective and provide inconsistent results. Accordingly, methods, systems, and apparatuses for preparing and cleaning dairy animal teats that are effective and provide consistent results are needed.

SUMMARY

A teat preparation liner comprising an inlet for fluid flow into the liner, an opening, a liner cavity and a spray ring is disclosed. The liner cavity is positioned adjacent to the opening inside the liner and surrounds a portion of the liner. The spray ring has a hollow interior and a plurality of apertures. The spray ring is coupled to the inlet so that fluid flows from the inlet into the hollow interior of the spray ring and out of the spray ring through the plurality of apertures. The spray ring is positioned inside the liner cavity so that the plurality of apertures face the inside of the liner opening. The spray ring is operable to encircle a dairy animal teat that is positioned inside the liner via the liner opening to simultaneously direct fluid flow from the inlet onto multiple portions of the teat via the apertures.

The disclosed embodiment has several technical advantages. Using the disclosed embodiment, multiple portions of a teat are simultaneously exposed to teat preparation and cleaning fluids which results in an even and consistent coverage of the teat. This more even coverage of the teat more thoroughly disinfects and cleans the teat prior to milking. Further, fluid flow through the multiple apertures of the spray ring results in a more regulated fluid flow rate which prevents injury to the teat that may otherwise result from the teat being exposed to only one concentrated jet of the fluid. Additionally, one of the present embodiments uses different cups for teat preparation and for milking thereby reducing the likelihood of disinfecting and teat preparation chemicals mixing with milk extracted from the teat.

Certain embodiments of the present disclosure may include some, all, or none of these advantages. One or more other technical advantages may be readily apparent to those skilled in the art from the figures, descriptions, and claims included herein.

BRIEF DESCRIPTION OF THE DRAWINGS

To provide a more complete understanding of the present disclosure and the features and advantages thereof, reference is made to the following description taken in conjunction with the accompanying drawings, in which.

DETAILED DESCRIPTION OF THE DRAWINGS

Modern dairy farms and parlors can use milking systems to collect milk from dairy animals. For example, milk can be collected from cows and other dairy animals by using milking systems that draw milk from the animals and transport the milk into pipelines and containers. By using such technology, dairy farms and parlors are able to increase the amount of milk they can collect from the dairy animals while still maintaining the health and safety of the dairy animals.

Some milking systems collect milk from dairy animals such as cows by connecting milking cups to cow udders and using machinery to induce milking. For example, these milking systems sometimes use pulsators to alternatively pressurize and depressurize the animal teat which stimulates milking. Before a dairy animal may be milked, however, it is advantageous to prepare the animal teat for milking. For example, it is beneficial to treat the teat with disinfecting chemicals and then wash and dry the teat before milking. This is usually done by exposing the animal teat to certain teat preparation chemicals for a period of time. After the teat has been exposed to these chemicals, the teat may be washed down with water or other fluids so that the residual chemicals do not mix with the milk when the animal is milked. The teat preparation chemicals and water are then collected and/or disposed of separately from where the milk is collected.

One way of exposing cow teats to such chemicals and water is by placing the animal teat inside a liner that is positioned inside a teat preparation cup. Inside the liner, a nozzle is positioned near the mouth of the liner. The teat preparation chemicals and water flow into the nozzle through an inlet. After the fluids reach the nozzle, they are injected into the liner through an opening in the nozzle. After the teat has been exposed to the fluids, the fluids run down the liner and exit the liner through an egress in the liner. The fluid is sometimes drawn into the egress by the pulsator as the pulsator depressurizes the preparation cup. Once the fluids have been washed off the teat, the teat is placed in a separate milking cup so that it may be milked.

One disadvantage of such an approach is that the nozzle may only have one opening through which fluids are injected into the liner. This results in only one portion of the teat being exposed to the fluids while the remaining portions of the teat remain unexposed. This uneven exposure can be unsanitary as dirt and bacteria that form on the unexposed portions of the teat remain untreated and can mix with the milk when the cow is subsequently milked. Further, exposing only one portion of a teat to concentrated teat preparation chemicals instead of exposing multiple portions of the teat to more diluted teat preparation chemicals can injure the animal.

To overcome these disadvantages, the present embodiment contemplates a spray ring that has multiple openings so that multiple portions of the teat are simultaneously exposed to the fluids. The cumulative effect of this approach is that a larger portion of the teat, and in some embodiments, the entire teat, is exposed to the fluids which results in a more hygienic overall milking process. This approach also obviates the need for any additional equipment to rotate the spray ring around the teat for more even coverage of the teat by the fluids.

Figure 1:
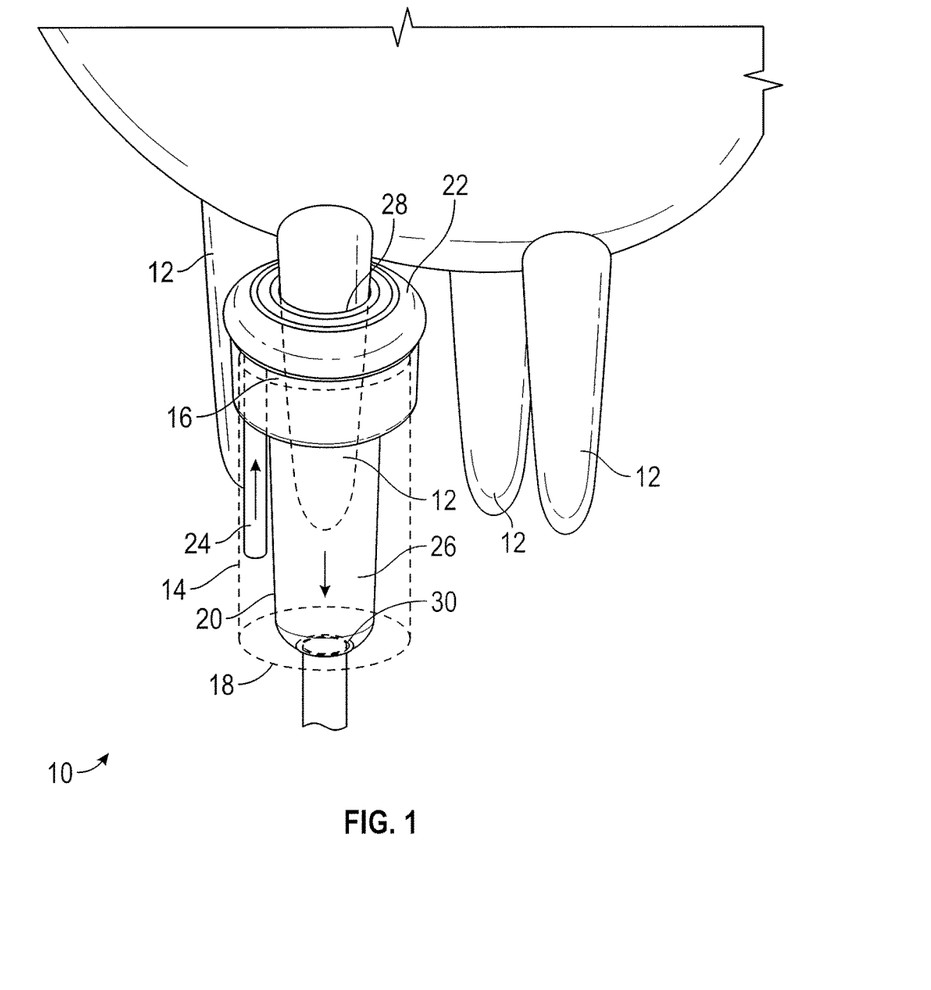
FIG. 1 illustrates a system comprising a teat preparation cup coupled to a cow.
Figure 2:
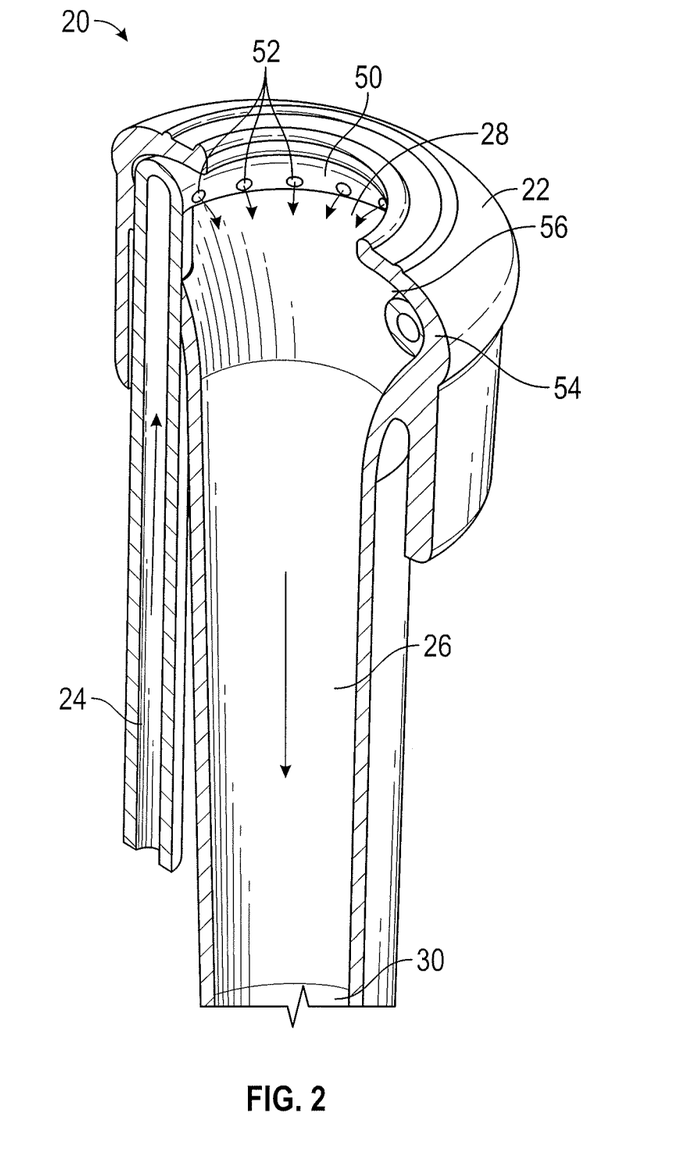
FIG. 2 illustrates a cross-section of the liner for a teat preparation cup.
Figure 3:
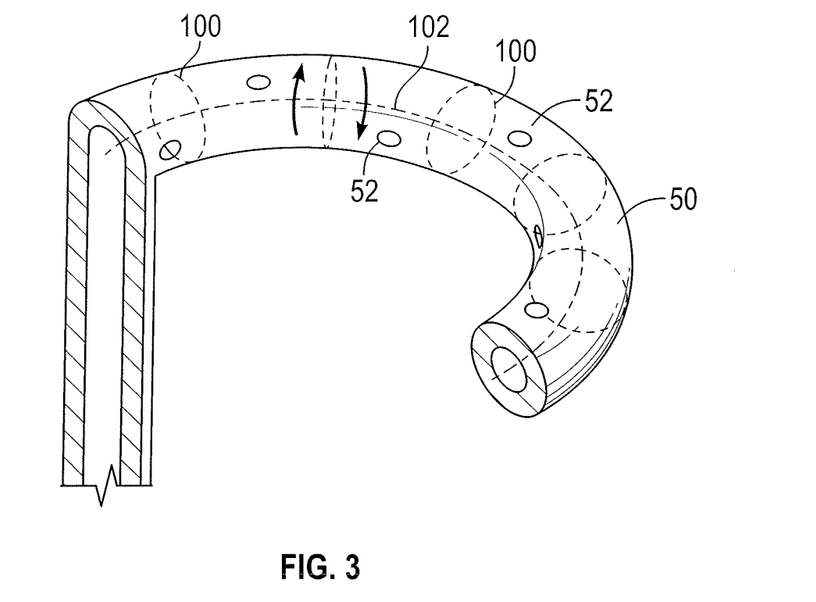
FIG. 3 illustrates one embodiment of a spray ring having multiple apertures that are axially offset from each other.
Figure 4:
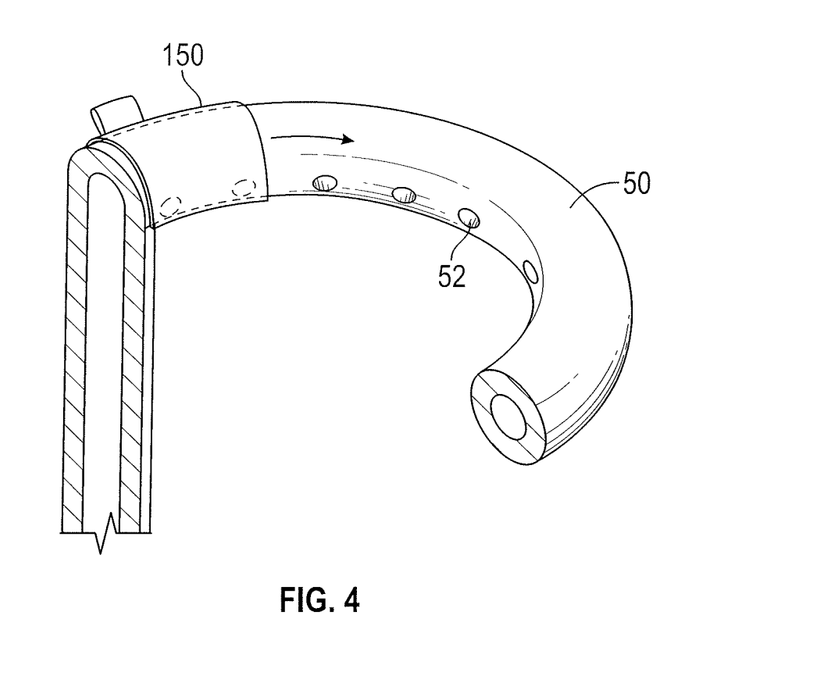
FIG. 4 illustrates one embodiment of a spray ring having multiple apertures and a shutter.
Figure 5:
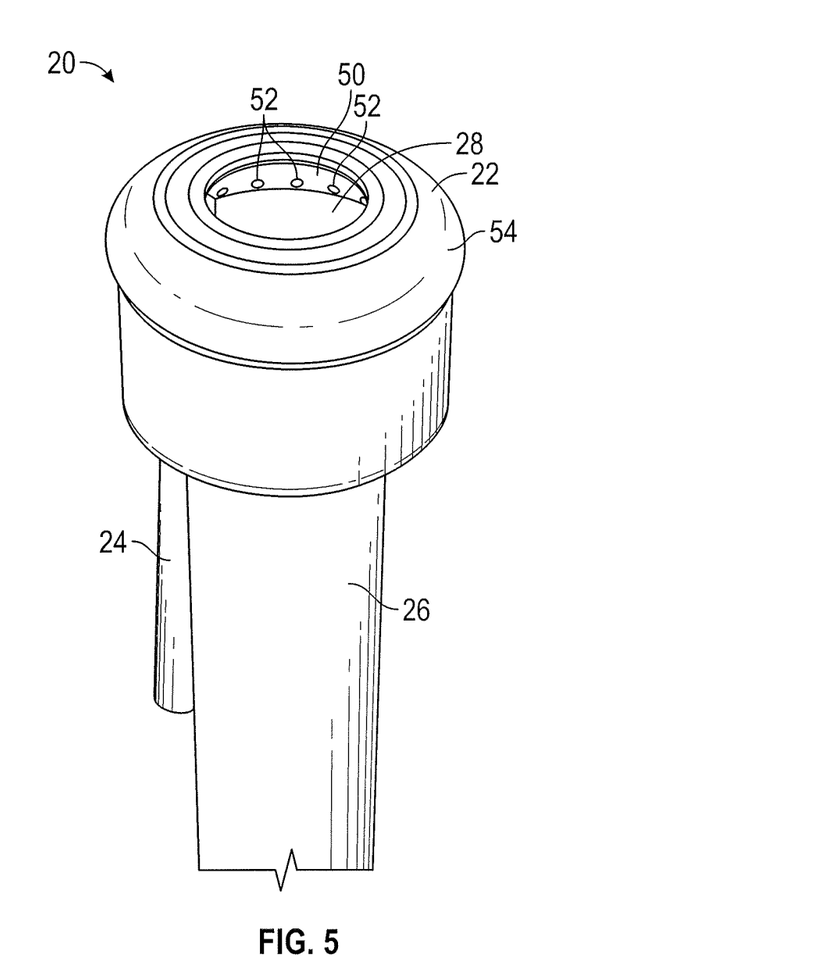
FIG. 5 illustrates a perspective view of a liner for the teat preparation cup.

The present disclosure will be described in more detail using FIGS. 1 through 5. FIG. 1 illustrates a teat preparation cup removably coupled to a cow. FIG. 2 illustrates a cross-section of the liner for a teat preparation cup coupled to a spray ring. FIG. 3 illustrates one embodiment of a spray ring having multiple apertures that are axially offset from each other. FIG. 4 illustrates one embodiment of a spray ring having multiple apertures and a shutter. And FIG. 5 illustrates a perspective view of a liner for the teat preparation cup.

FIG. 1 illustrates a system 10 comprising a teat preparation cup 14 and a liner 20. Teat preparation cup 14 has a first opening 16 and a second opening 18. As shown, a liner 20 that has a mouthpiece 22, an inlet 24, and an egress 26 is positioned inside teat preparation cup 14. Further, as illustrated, one of the teats 12 of a dairy animal is positioned inside liner 20 via mouthpiece 22.

As shown, teat 12 suspends from an udder of a dairy animal and may be positioned inside a teat preparation cup 14. Although this disclosure contemplates that the dairy animal is a cow, in other embodiments, the dairy animal may be any other suitable animal including goats, sheep, buffalo etc.

Teat preparation cup 14 may be any container, vessel, tube or conduit through which fluids can flow. In various embodiments, teat preparation cup 14 may be made of various different materials including metals and flexible or rigid polymers. Teat preparation cup 14 may be of any suitable size large enough to fit teat 12 and liner 20. Teat preparation cup 14 has a first opening 16 and a second opening 18.

First opening 16 of teat preparation cup 14 is positioned at one end of teat preparation cup 14 and second opening 18 is positioned at a second end of teat preparation cup 14. First opening 16 and second opening 18 may be of any suitable shape including a circular shape. First opening 16 is sized so that at least a portion of teat 12 may be inserted into teat preparation cup 14 via first opening 16. Second opening 18 is sized so that fluid inside liner 20, which is positioned inside teat preparation cup 14, may flow out of teat preparation cup 14.

Liner 20 is a flexible tube or conduit that may be positioned inside teat preparation cup 14. Liner 20 may be made of any suitable material including any flexible polymer or rubber. In some embodiments, liner 20 may be molded to approximate the shape of teat 12. Liner 20 is operable to relax and constrict as the air pressure between liner 20 and teat preparation cup 14 increases and decreases. As such, in embodiments where liner 20 is coupled to a pulsator (not shown) operable to pressurize and depressurize teat preparation cup 14, liner 20 relaxes and constricts as the pulsator pressurizes and depressurizes teat preparation cup 14.

In the illustrated embodiment, liner 20 has a mouthpiece 22 that facilitates coupling liner 20 to teat preparation cup 14. Mouthpiece 22 defines a first liner opening 28. The first liner opening 28 corresponds to the first opening 16 of teat preparation cup 14. When liner 20 is coupled to teat preparation cup 14, mouthpiece 22 couples with first opening 16 of teat preparation cup 14 so that first liner opening 28 is positioned substantially in line with first opening 16 of teat preparation cup 14. In this manner, when teat 12 is inserted into teat preparation cup 14, teat 12 engages with first liner opening 28 instead of first opening 16 of teat preparation cup 14. Because liner 20 is made of a flexible material, teat 12 is less likely to be injured when it engages with first liner opening 28 instead of first opening 16 of teat preparation cup 14.

Liner 20 also has a second liner opening 30 at a second end of liner 20. The second liner opening 30 corresponds to the second opening 18 of teat preparation cup 14. When liner 20 is coupled to teat preparation cup 14, liner 20 is positioned so that fluid flowing out of liner 20 flows through second liner opening 30 as well as second opening 18 of teat preparation cup 14.

Liner 20 further comprises an inlet 24. Inlet 24 is any conduit through which fluid for preparing, treating, washing, cleaning, drying, etc. may enter liner 20. Any suitable fluid may flow through inlet 24. For example, chemicals such as hydrogen peroxide, sodium hypochlorite, acidified sodium chlorite, or any other suitable chemical for preparing or cleaning teat 12 may flow through inlet 24. Similarly, fluids such as water, air, or any other suitable fluids for cleaning or drying teat 12 may also flow through inlet 24. As explained in greater detail with respect to FIG. 2 below, in some embodiments, inlet 24 may be coupled to a spray ring that is positioned inside liner 20 proximate to liner mouthpiece 22. In this manner, fluid may flow through inlet 24 and enter liner 20 at a point proximate to mouthpiece 22 through the spray ring. In various embodiments, inlet 24 may be formed as part of liner 20 or may be a separate piece coupled to liner 20. Furthermore, some liners 20 may not have an inlet 24. In such embodiments, teat preparation cup 14 may have an inlet 24 that is coupled to the spray ring.

Liner 20 also has an egress 26. Egress 26 may be any conduit or bore that allows fluid to flow through and out of liner 20. Egress 26 is a conduit between mouthpiece 22 and second liner opening 30 and, in some embodiments, one end of egress 26 is mouthpiece 22 and a second end of egress 26 is second liner opening 30. In this manner, fluid may flow from mouthpiece 22 through liner 20 and out of second liner opening 30. To facilitate fluid flow out of egress 26, liner 20 may be coupled to a pulsator (not shown). The pulsator may depressurize liner 20 so that air pressure inside egress 26 proximate to second liner opening 30 is lower than air pressure proximate to mouthpiece 22. In this manner, fluid that enters liner 20 is pushed, by the imbalance in air pressure, out of liner 20 via second liner opening 30.

In operation, when teat 12 needs to be prepared for milking, teat 12 is placed inside liner 20 and liner 20 is positioned within teat preparation cup 14. Liner 20 is positioned inside teat preparation cup 14 such that first opening 16 of teat preparation cup 14 is substantially aligned with first liner opening 28 of liner 20. Thus, teat 12 enters the teat preparation cup 14 through first opening 16 and teat 12 enters liner 20 through first liner opening 28. Once teat 12 is positioned inside teat preparation cup 14 and liner 20, fluid is injected into inlet 24. The fluid enters liner 20 and sprays or otherwise comes in contact with teat 12. The fluid then flows out of liner 20 via egress 26 and second liner opening 30. In one embodiment, fluid flow down teat 12 and out of liner 20 is facilitated by depressurization inside liner 20 caused by a pulsator. After a period of time, fluid flow through inlet 24 stops. At this point, teat 12 is ready for milking and teat 12 is removed from teat preparation cup 14 and placed in a separate milking cup for milking. In some embodiments, teat 12 may be milked using teat preparation cup 14 instead of a different milking cup.

Although the present embodiment describes using teat preparation cup 14 for preparing teat 12 for milking, teat preparation cup 14 may also be used for cleaning teat 12 after milking or for preparing teat 12 for any other suitable purpose including any dairy, medical or other purpose.

FIG. 2 illustrates a cross-section of liner 20 showing mouthpiece 22, inlet 24, egress 26, and mouthpiece opening 28. FIG. 2 further illustrates a spray ring 50 that has multiple spray ring apertures 52. In an embodiment as illustrated in FIG. 2, spray ring 50 is nested within a mouthpiece cavity 54. As illustrated, spray ring 50 is coupled to inlet 24 and spray ring apertures 52 face the inside of liner 20. In other embodiments, spray ring 50 may be coupled to teat preparation cup 14 instead of liner 20. For example, spray ring 50 may be coupled to teat preparation cup 14 adjacent to liner 20 inside teat preparation cup 14. In another embodiment, spray ring 50 may be positioned on top of teat preparation cup 14 so that fluid from spray ring 50 flows into liner 20 via first liner opening 28.

Spray ring 50 may be any device or member that can be coupled to inlet 24 and is operable to direct fluid flow out of inlet 24. Spray ring 50 may be made of a rubber, a polymer, a metal, or any other suitable material. In some embodiments, spray ring 50 is removably coupled to inlet 24. In other embodiments, both spray ring 50 and inlet 24 are removably coupled to liner 20. In at least some embodiments, spray ring 50 is positioned inside liner 20 proximate to mouthpiece opening 28. In other embodiments, spray ring 50 may be positioned outside liner 20 proximate to mouthpiece opening 28. Spray ring 50 may, in some embodiments, encircle mouthpiece opening 28. In other embodiments, spray ring 50 may partially surround mouthpiece opening 28. Spray ring 50 may be hollow and may have an inner dimension such as an inner diameter that is large enough for any suitable teat preparation fluid, water, or air to flow through spray ring 50. Spray ring 50 may be of any suitable shape including a circular or non-circular shape. In some embodiments, spray ring 50 may be elliptical or may have three or more sides forming a triangular, quadrilateral, pentagonal or any other suitable shape.

Spray ring 50 may have one or more apertures 52 formed therein. Fluid flows out of spray ring 50 through apertures 52. Apertures 52 may be of any suitable size or shape for fluids, including teat preparation chemicals, water, and/or air, to flow out of spray ring 50. In some embodiments, apertures 52 may be shaped so that liquid fluid sprays as it flows out of apertures 52. In other embodiments, apertures 50 may be shaped so that fluid flows out of apertures 52 in one or more streams. Apertures 52 may be positioned so that they all face the inside of liner 20. In one embodiment, apertures 52 are formed upon multiple portions of spray ring 50 so that fluid flows out of the multiple apertures 52 substantially simultaneously.

In one embodiment, spray ring 50 has a plurality of apertures 52 formed therein that are all substantially evenly spaced apart from each other. In some embodiments, spray ring 50 may comprise multiple members having apertures 52 formed therein that are coupled together to form a ring. For example, in one embodiment, two members with three or more apertures 52 formed therein may be coupled together to form spray ring 50 having six or more apertures 50 in total. Directing fluid flow out of spray ring 50 via the plurality of apertures 52 results in a substantially even fluid flow that effectively exposes most or all of teat 12 to the fluid in a time-efficient manner. Other embodiments of spray ring 50 are illustrated in FIGS. 3 and 4 and discussed in reference to those figures below.

As discussed above with reference to FIG. 1, mouthpiece 22 defines a first liner opening 28. Mouthpiece 22 further includes a mouthpiece cavity 54 that is positioned below mouthpiece opening 28. Mouthpiece cavity 54 is an indentation or bulge that defines a recess within liner 20. Mouthpiece cavity 54 may be internally hollow and may have an inner dimension, such as an inner diameter, that is large enough that spray ring 50 may be positioned inside mouthpiece cavity 54. In some embodiments, spray ring 50 is nested proximate to or adjacent to mouthpiece cavity 54 so that spray ring 50, which is positioned inside mouthpiece opening 28, does not block mouthpiece opening 28. Mouthpiece cavity 54 may have a cavity opening 56. Spray ring 50 may be positioned inside mouthpiece opening 28 so that apertures 52 of spray ring 50 align with cavity opening 56 and face the inside of liner 20. In other embodiments, mouthpiece opening 28 may be large enough that spray ring 50 may partially block mouthpiece opening 28 without affecting the functionality of mouthpiece opening 28. For example, in such embodiments, spray ring 50 may be positioned inside liner 20 such that part of mouthpiece opening 28 is blocked by spray ring 50. But mouthpiece opening 28 may be large enough that teat 12 may be positioned inside mouthpiece opening 28 despite spray ring 50 partially blocking mouthpiece opening 28.

In operation, teat 12 is positioned inside liner 20 via mouthpiece opening 28. As fluid is injected into inlet 24, the fluid flows from inlet 24 into spray ring 50. The fluid then flows out of inlet 24 via apertures 52. As fluid flows out of apertures 52, at least some of the fluid comes in contact with multiple portions of teat 12 that is positioned inside liner 20. In some embodiments, spray ring 50 encircles teat 12 and the fluid is directed onto substantially all portions of teat 12. The fluid then disinfects, washes, dries, and/or performs other preparatory functions to teat 12. In some embodiments, a teat preparation chemical such as a disinfectant first flows through inlet 24 to disinfect and treat teat 12. Then, a cleaning fluid such as water flows through inlet 24 and onto teat 12 to wash the teat preparation chemical off of teat 12. The fluids then flow out of liner 20 via egress 26. Egress 26 terminates at second liner opening 30 and the fluid flows out of liner 20 through second liner opening 30. In this manner, multiple portions of teat 12 are exposed to the fluid resulting in more even coverage of teat 12. Further, the multiple apertures 52 of spray ring 50 result in a more regulated fluid flow rate out of spray ring 50 which prevents injury to teat 12 that may result from teat 12 being exposed to only one concentrated jet of the fluid. Although the present embodiment illustrates only one spray ring 50 positioned inside liner 20, in other embodiments a plurality of spray rings 50 may be positioned inside or on any other suitable portion of liner 20 or teat preparation cup 14. In different embodiments, various different fluids may flow through the plurality of spray rings 50. For example, in an embodiment with two spray rings 50, air may flow through one spray ring 50 and disinfecting chemicals may flow through a second spray ring 50.

FIG. 3 illustrates one embodiment of spray ring 50 where apertures 52 direct fluid flow into liner 20 but are axially offset from each other along axis 102 so that they direct fluid onto different internal portions of liner 20. In this manner, apertures 52 may simultaneously expose both a higher and lower portion of teat 12 to the fluid. The axially offset apertures 52 may be stationary or may be operable to rotate. For example, in one embodiment, spray ring 50 may form a ring and apertures 52 may be formed inside that ring so that they are either axially aligned or axially offset from each other. In another embodiment, spray ring 50 may comprise one or more rotary joints 100 between apertures 52 as illustrated in the embodiment of FIG. 3.

Rotary joints 100 may be any union that allows for rotation of one or more apertures 52 independently of the remaining apertures 52. Rotary joints 100 may comprise bearings, a shaft, and/or any other suitable components.

In such an embodiment of spray ring 50, one or more apertures 52 may be operable to rotate axially independently of the other apertures 52 in spray ring 50. In this manner, one or more apertures 52 may direct fluid to different portions of liner 20 and the direction of apertures 52 may be changed. Although the embodiment illustrated in FIG. 3 shows rotary joints 100 positioned between each aperture 52, in other embodiments, rotary joints 100 may be positioned at any suitable portion of spray ring 50. For example, in some embodiments, spray ring 50 may have two rotary joints 100 so that each half of spray ring 50 may rotate independently from the other half. Additionally, in other embodiments, spray ring 50 may comprise any other suitable mechanism for allowing various portions of spray ring 50 to rotate.

FIG. 4 illustrates another embodiment of spray ring 50 that is operable to close some or all apertures 52 to regulate the flow of fluid out of apertures 52. In this embodiment, spray ring 50 is slidably coupled to a shutter 150 that is operable to open or close one or more apertures 52. In one embodiment, shutter 150 may be a sheet of metal, polymer, rubber, or any other suitable material that is operable to slide along spray ring 50 to open and/or close apertures 52. In such an embodiment, some apertures 52 may be closed while other aperture 52 are open so that fluid flows out of apertures 52 sequentially or only flows out of open apertures 52 and not out of closed apertures 52. For example, shutter 150 may slide along spray ring 50 to open a first aperture 52 and close a second aperture 52. Then, as shutter 150 continues to slide along spray ring 50, first aperture 52 may be closed and the second aperture 52 opened. This may allow for better regulation of fluid flow out of apertures 52. Although the illustrated embodiment shows only one shutter 150, in other embodiments, spray ring 50 may have a plurality of shutters 150 that are slidably coupled to different portions of spray ring 50.

FIG. 5 illustrates a perspective view of liner 20 showing spray ring 50 nested within mouthpiece cavity 54. As shown, spray ring 50 does not block mouthpiece opening 28 because mouthpiece cavity 54 is indented within mouthpiece 22. In the illustrated embodiment of FIG. 5, apertures 52 of spray ring 50 are all directed toward the inside of liner 20. In this manner, fluid that flows out of apertures 52 flows into liner 20. As shown, inlet 24 runs alongside egress 26 and couples with spray ring 50 inside mouthpiece 22. Fluid that flows through inlet 24 toward mouthpiece 22 exits inlet 24 via apertures 52. The fluid then flows out of liner 20 through egress 26.

Modifications, additions, or omissions may be made to the systems, apparatuses, and processes described herein without departing from the scope of the disclosure. The components of the systems and apparatuses may be integrated or separated. Moreover, the operations of the systems and apparatuses may be performed by more, fewer, or other components. The methods may include more, fewer, or other steps. Additionally, steps may be performed in any suitable order. Additionally, operations of the systems and apparatuses may be performed using any suitable logic. As used in this document, "each" refers to each member of a set or each member of a subset of a set.

Although several embodiments have been illustrated and described in detail, it will be recognized that substitutions and alterations are possible without departing from the spirit and scope of the present disclosure, as defined by the appended claims. To aid the Patent Office, and any readers of any patent issued on this application in interpreting the claims appended hereto, applicants note that they do not intend any of the appended claims to invoke 35 U.S.C. § 112(f) as it exists on the date of filing hereof unless the words "means for" or "step for" are explicitly used in the particular claim.

What is claimed is:

1. A system comprising:
    a teat preparation cup;
    a liner coupled to the teat preparation cup, wherein the liner has an opening and a liner cavity and wherein the liner cavity is positioned adjacent to the opening inside the liner and is nested under the opening so that the liner cavity surrounds one portion of the liner; and
    a spray ring having a hollow interior and a plurality of apertures formed thereon, wherein the spray ring is coupled to an inlet so that fluid flows from the inlet into the hollow interior of the spray ring and out of the spray ring through the plurality of apertures, and the spray ring is positioned inside the liner cavity so that the plurality of apertures face the inside of the liner opening, and wherein the spray ring is operable to encircle a dairy animal teat positioned inside the liner via the liner opening and the spray ring is operable to simultaneously direct fluid flow from the inlet onto multiple portions of the teat via the plurality of apertures;
    wherein one or more of the plurality of apertures in the spray ring is operable to rotate axially independently of the other apertures in the spray ring.

2. The system of claim 1, wherein one or more of the plurality of apertures of the spray ring is axially offset from one or more other apertures for simultaneously directing fluid flow onto higher and lower portions of the liner.

3. The system of claim 1, wherein two or more of the plurality of apertures are coupled together by one or more rotary joints.

4. The system of claim 1, wherein a shutter is slidably coupled to the spray ring and the shutter is operable to open or close one or more of the plurality of apertures.

5. The system of claim 1, wherein the plurality of apertures are spaced substantially evenly from each other on the spray ring.

6. The system of claim 1, wherein the spray ring is circular.

7. A system comprising:
    a teat preparation cup;
    a liner coupled to the teat preparation cup, wherein the liner has an opening and a liner cavity and wherein the liner cavity is positioned adjacent to the opening inside the liner and is nested under the opening so that the liner cavity surrounds one portion of the liner; and
    a spray ring having a hollow interior and a plurality of apertures formed thereon, wherein the spray ring is coupled to an inlet so that fluid flows from the inlet into the hollow interior of the spray ring and out of the spray ring through the plurality of apertures, and the spray ring is positioned inside the liner cavity so that the plurality of apertures face the inside of the liner opening, and wherein the spray ring is operable to encircle a dairy animal teat positioned inside the liner via the liner opening and the spray ring is operable to simultaneously direct fluid flow from the inlet onto multiple portions of the teat via the plurality of apertures;
    wherein a shutter is slidably coupled to the spray ring and the shutter is operable to open or close one or more of the plurality of apertures.

8. The system of claim 7, wherein one or more of the plurality of apertures of the spray ring is axially offset from one or more other apertures for simultaneously directing fluid flow onto higher and lower portions of the liner.

9. The system of claim 7, wherein one or more of the plurality of apertures in the spray ring is operable to rotate axially independently of the other apertures in the spray ring.

10. The system of claim 9, wherein two or more of the plurality of apertures are coupled together by one or more rotary joints.

11. The system of claim 7, wherein the plurality of apertures are spaced substantially evenly from each other on the spray ring.

12. The system of claim 7, wherein the spray ring is circular.

* * * * *